G. S. BAKER.
CHOCOLATE DEPOSITING MACHINE.
APPLICATION FILED JAN. 28, 1910.

1,118,619.

Patented Nov. 24, 1914.
7 SHEETS—SHEET 1.

G. S. BAKER.
CHOCOLATE DEPOSITING MACHINE.
APPLICATION FILED JAN. 28, 1910.

1,118,619.

Patented Nov. 24, 1914.
7 SHEETS—SHEET 2.

G. S. BAKER.
CHOCOLATE DEPOSITING MACHINE.
APPLICATION FILED JAN. 28, 1910.

1,118,619.

Patented Nov. 24, 1914.
7 SHEETS—SHEET 7.

UNITED STATES PATENT OFFICE.

GEORGE SAMUEL BAKER, OF LONDON, ENGLAND.

CHOCOLATE-DEPOSITING MACHINE.

1,118,619.  Specification of Letters Patent.  Patented Nov. 24, 1914.

Application filed January 28, 1910. Serial No. 540,580.

*To all whom it may concern:*

Be it known that I, GEORGE SAMUEL BAKER, a subject of the King of England, residing at Willesden Junction, London, N. W., in England, have invented certain new and useful Improvements in Chocolate-Depositing Machines, of which the following is a specification.

This invention relates to machines for depositing chocolate and other plastic substances into receptacles such as tins or molds, and relates more particularly to novel forms of mechanism for transferring the filled tins or molds carried by wooden or other trays from the filling table of the depositing machine onto tapping tables either of single, double or multiple formation disposed adjacent to said filling machine.

The invention also relates to means for operating the transfer mechanism at the proper time or in proper sequence from said depositing machine.

The invention further relates to means for conveying the filled molds through devices for cooling the contents thereof, and for drying and returning the empty molds to a position near the depositing machine.

Embodiments of the invention are represented in the accompanying drawings in which—

Fig. 3ª is an end elevation from the left hand side of Fig. 3 with parts removed.

Figure 1:
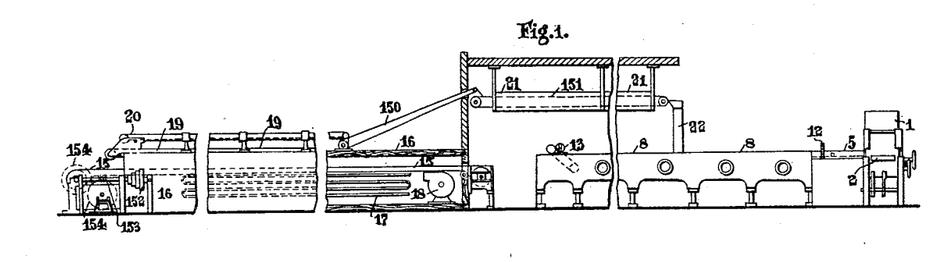
Figure 1 is a diagrammatic elevation view showing the general arrangement of the machine.
Figure 2:
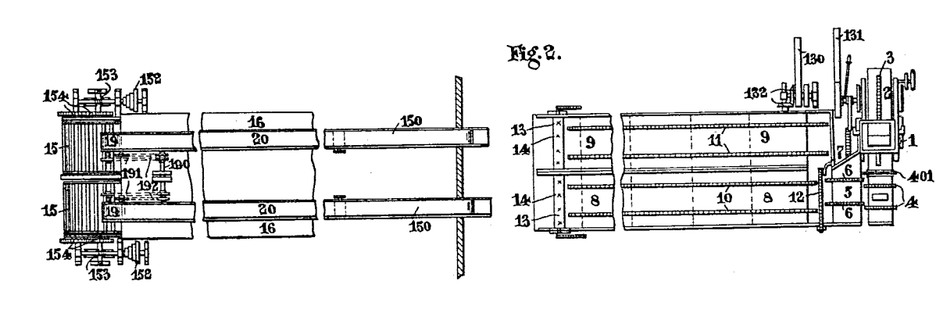
Fig. 2 is a plan view of Fig. 1 with certain parts removed, showing two series of parallel tapping tables.

Referring to Figs. 1 and 2 the general arrangement and function of the machine as a whole are as follows, it being understood that either a single series of tapping tables may be used in lieu of the two series shown in Fig. 2 or more than two such series if required, the transfer mechanism being modified or multiplied accordingly. The depositing machine has the feed hopper 1 and table 2 in which works the feed chain 3 for the trays and across which travel the primary transfer chains 4.

5 indicates the intermediate table used only when there are two or more series of tapping tables and across which travel the transfer chains 6, said table having a raised inclined edge 7, for a purpose hereinafter explained, and 8 and 9 indicate the two series of parallel tapping tables disposed at right angles to the depositing machine on which the trays are shaken or jogged to compact the chocolate in the molds. Each of said series of tables is traversed longitudinally by a pair of conveyer chains 10 and 11 respectively and the alternate transfer of a tray from the intermediate table 5 to the further series of tables 9 is effected by an overhead conveyer chain 12, hereinafter fully described. All the conveyer chains are provided with spaced lugs or abutments for example as shown at 303 Fig. 3 hereinafter referred to adapted to engage an edge of each tray for conveying same in the known manner.

At the end of the tapping table or tables the trays of filled molds pass under a roller 13 provided with dies such as 14 for impressing a mark on each deposit for identifying each batch of material treated. On reaching the ends of the tables the filled molds are removed from the trays by hand and placed on an endless conveyer or conveyers 15 (two being shown in Fig. 2) which traverse a cooling chamber 16 of considerable length preferably contained in a separate room divided from the room in which the tapping tables are situated by an insulating partition, the trays themselves being returned by hand to the depositing machine for receiving a fresh supply of empty molds. The cooling chamber may be of any appropriate construction, that shown in the drawings including a cooling coil 17 and a fan 18 for distributing the cold air around the molds on the conveyers 15. On emerging from the chamber 16 the molds are removed from the conveyers 15 by hand and placed upon upper conveyers 19 traveling in a reverse direction viz. toward the depositing machine. As the molds move along on said conveyers 19 operatives stationed at the sides of the machine remove or knock out the deposits from the molds on to the top of the cooling chamber and place said molds upon still higher conveyers 20 which pass them to inclined belts 150 traversing narrow apertures in the partition referred to and deposit them upon other conveyers 151 traversing drying chambers 21 suspended from the ceiling and conveying said molds to piling boxes or chutes 22 located at points adjacent the depositing machine. The conveyers 15 may be driven as shown from step pulleys 152 located at the sides of the machine through worm and worm wheel gear 153 and spur gear 154 and the conveyers 19 and 20 may be driven from the pulley shaft 190 by chain transmission 191, 192 respectively or other means may be used.

Figure 3:
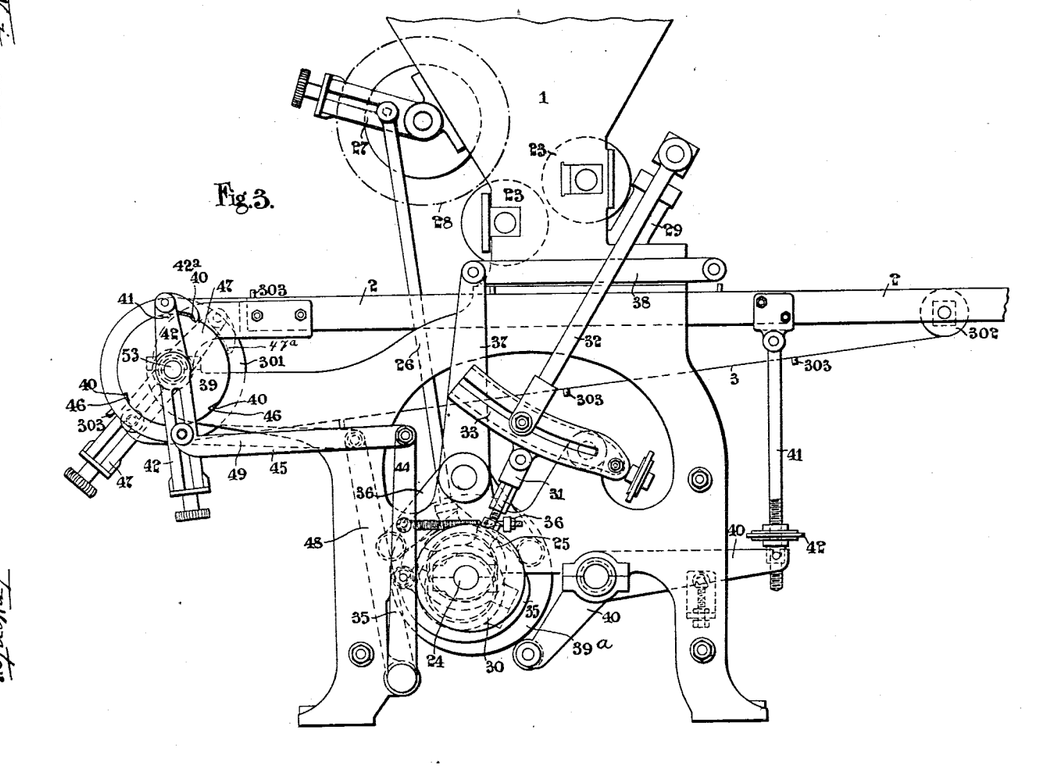
Fig. 3 is a side elevation of the depositing machine proper, with certain parts omitted for clearness of illustration.
Figure 3A:
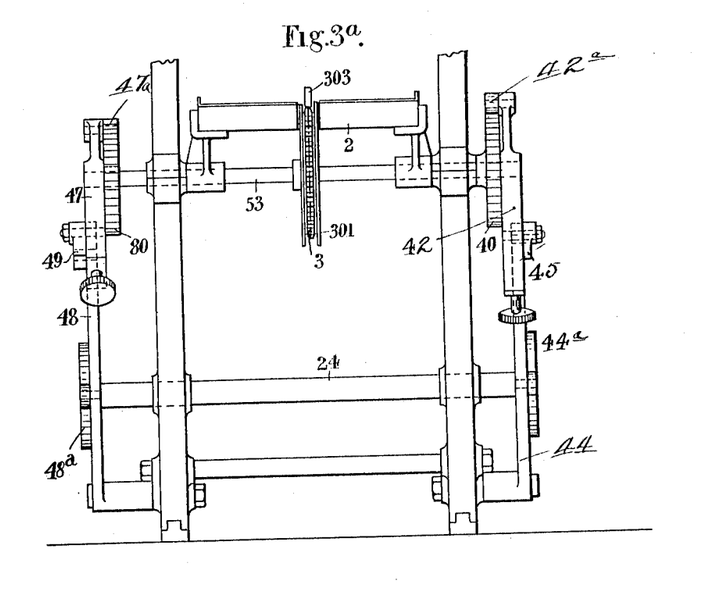

Referring now to Figs. 3 and 3ª, this shows a depositing or mold filling machine of known construction having the table 2 traversed by the chain 3 carried by chain pulleys 301 and 302 and provided with abutments 303 for engaging the edges of the trays filled with the molds and placed on the table. The chain pulley 301 is mounted on a shaft 53 hereinafter referred to. Above the table is the feed hopper 1 provided with the feed rolls 23 geared together and operated from the main shaft 24 by eccentric 25, rod 26 ratchet and pawl mechanism 27 and gear 28. The material is discharged from the hopper by the pump 29 operated from the shaft 24 by the eccentric 30 and rods 31 and 32 (between which is interposed a link 33 for adjusting the stroke of the pump) the material being discharged by said pump through a slide (not shown) positively operated in both directions from the main shaft 24 by means of two cams 35, levers 36, lever 37 and rod 38.

The table 2 is of the known rising and falling kind, being pivoted at its rear or left hand end, movement being imparted thereto from the main shaft 24 by the cam 39, bell crank lever 40 and rod 41, the extent of movement being regulated by the nut 42 and rod 41, the left hand end of the table rocking upon its pivotal point. The required intermittent feed movements of the chain 3 are produced by pawl and ratchet mechanisms shown in Figs. 3 and 3ª. One of such mechanisms moves the chain at the desired uniform rate while the chocolate is being deposited to fill the molds and then stops said chain, this mechanism comprising a finely toothed disk 80 mounted on the shaft 53 and a pawl 47ª carried by an arm 47 operated from the main shaft 24 by means of a cam 48ª thereon, lever 48 and rod 49. Also mounted on the shaft 53 at the opposite side of the machine is another finely toothed disk 40 operated by a pawl 42ª carried by an arm 42 operated by means of a cam 44ª on shaft 24, lever 44 and rod 45. This second ratchet and pawl mechanism feeds the chain 3 when no chocolate is being deposited, that is to say, its pawl carrying arm 42 moves forward when the corresponding arm 47 of the first mentioned mechanism is moving rearward and thus feeds the chain 3 to bring further molds into position for a fresh deposit.

Figure 4:
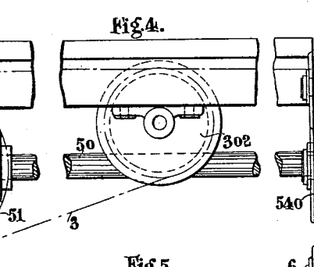
Fig. 4 is a side elevation with parts broken away of the filling table of the depositing machine, showing the mechanism for driving the tray feeding conveyer and the connection of said driving mechanism with a single transfer mechanism.
Figures 5, 6:
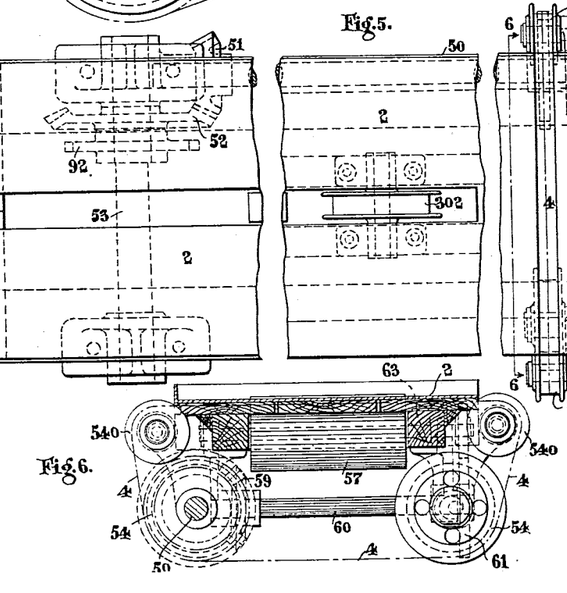
Fig. 5 is a plan view of Fig. 4.
Fig. 6 is a section taken on the plane of the line 6—6 of Fig. 5.

Referring to Figs. 4, 5 and 6, it will be seen that below the table is a shaft 50 adapted to be rotated at the required times by means hereinafter described through the bevel gears 51, 52 the latter being loosely carried by a shaft 53 on which is mounted the chain pulley 301 and the chain feed mechanisms previously described. The opposite end of the shaft 50 carries a pair of chain wheels 54 about which pass the two transfer chains 4, 4 (see also Fig. 2), passing also around other upper pulleys 540 and traversing slots 55 in the table and provided with projections in the known manner. These chains engage the trays fed along by chain 3 and transfer them in succession either to the intermediate table 5 (Fig. 2) where two or more series of tapping tables are employed or direct to the tapping tables where there is only one series thereof. A third transfer chain 401 (Figs. 2 and 10) nearer the feed hopper and arranged similarly to those just described may be employed if required, such third chain being found desirable in cases where the trays are not sufficiently long to be fed far enough to be properly engaged by the outer pair of chains 4, 4. The transfer chains 4 and 401 are driven at a faster speed than the feed chain 3 for example at twice the speed so as to effect the transfer quickly and afford the desired spacing of the trays on the tapping tables.

For assistance in carrying the trays to the end of the table so that the transfer may be neatly and efficiently effected by the chains 4, 4, I may provide in the table a slot 56 through which slightly extends the roughened surface of a roller 57 driven in the direction of the arrow, Fig. 4, at a faster speed than the chain 4, for example, at twice the speed by means of a bevel gear 58 on shaft 50 meshing with bevel gear 59 on shaft 60 carrying a spur wheel 61 meshing with pinion 62 on the shaft of said roller, the latter engaging the under surface of the tray and carrying it rapidly along toward the outer end of the table without relying on the pushing action of the succeeding tray to complete the movement when the first tray has left the chain 3. Those trays which commence to be transferred from the table 2 at points nearer the feed hopper 1 engage the inclined abutment 7 (Figs. 2 and 10) which guides them in a diagonal or inclined course across the table 5 either to the tapping tables 8 or to be acted on by the transfer chain 12 for conveyance to the tables 9.

Figures 7, 8:
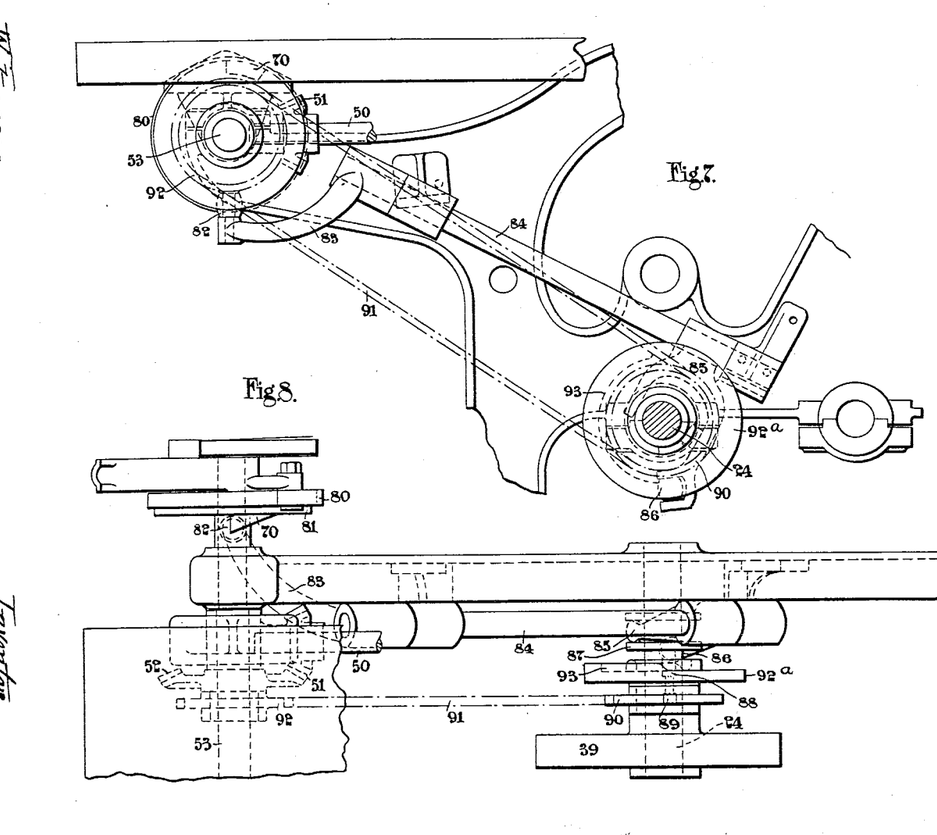
Fig. 7 is a side elevation showing mechanism for actuating the driving mechanism shown in Figs. 4 to 6 from the main shaft of the depositing machine.
Fig. 8 is a plan view of Fig. 7.

Two forms of mechanism employed for operating the shaft 50 at the required times from the main driving shaft 24 of the depositing machine are shown in Figs. 7 and 8 and 13 and 14 respectively. Referring to Figs. 7 and 8, such mechanism comprises a lateral projection 70 on the disk 80 before referred to or on a disk 81 or equivalent moving therewith on the shaft 53, said projection acting on roller 82 mounted on arm 83 integral with an inclined rock shaft 84 the opposite end of which carries a forked clutch member 85 embracing the main shaft 24. One arm of said member 85 is provided with a roller 86 and the other arm bears against a disk 87 slidably mounted on the shaft 24 and carrying a pin 88 adapted to engage an aperture 89 in a chain wheel 90 loosely mounted on shaft 24. The said wheel 90 is connected by chain 91 to another chain wheel 92 in rigid connection with the bevel gear 52 before referred to loose on the shaft 53. It will thus be seen that when the projection 70 engages the roller 82 and rocks the arm 83 and consequently the shaft 84 the engagement of said pin 88 and aperture 89 will be effected and thus cause the chain wheel 90 to take part in the rotary movement of shaft 24, this movement being communicated by chain 91 and bevel gears 51, 52 to the shaft 50 so that the transfer chains 4 and roller 57 are actuated. When the pin 88 is in engagement with the wheel 90 the aforesaid roller 86 on the clutch 85 bears against a disk 92ª rotatable with wheel 90 and having an enlarged flange portion 93 which, when it comes into contact with said roller forces back the clutch 85 and releases the chain wheel 90 thus stopping the movement of the chains 4, etc. The alternative mechanism shown in Figs. 13 and 14 and the operation thereof is as follows:—To the shaft 24 is keyed a chain wheel 133 which drives the intermeshing gear wheels 134 and 135 through the medium of chain 136, chain wheel 137 and spindle 138. On the shaft 139 of gear wheel 135, is fixed a disk wheel 140 to which is attached a cam roller 141.

Figure 13:
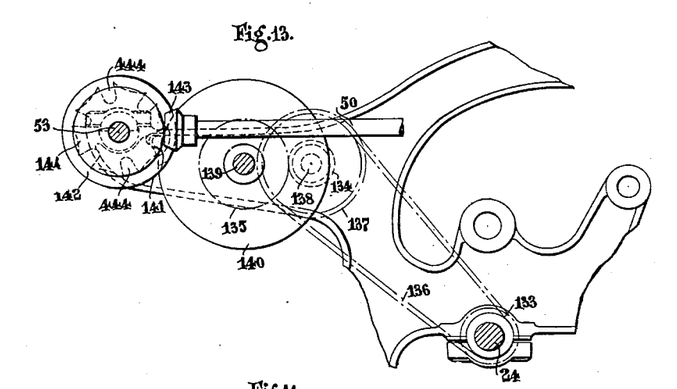
Figs. 13 and 14 are respectively a side elevation and plan view of alternative mechanism to that shown in Figs. 7 and 8.
Figure 14:
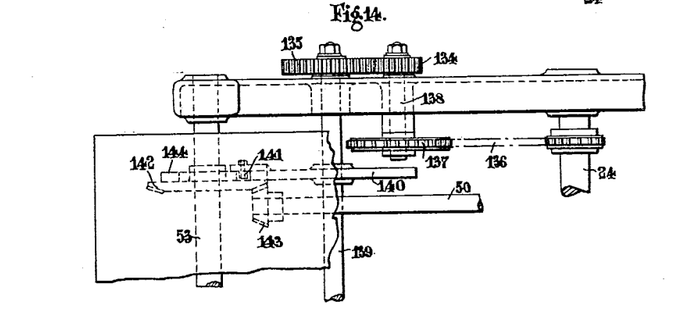

142 and 143 are respectively a bevel wheel and pinion wheel, 142 being free to revolve on shaft 53, while the pinion 143 is fixed to shaft 50. To the back of bevel wheel 142 is fixed a star-wheel 144 having on its periphery a number of slots 444 into which the cam roller 141 can engage and also a concave surface or edge of such shape as to fit the periphery of disk wheel 140. It will be evident that during a part revolution of the disk wheel 140, the star-wheel 141 is caused to revolve through a definite angle by means of the cam roller 141 engaging a slot, while during the remainder of the revolution the wheel 141 is locked by the periphery of said wheel engaging a concave surface of the star-wheel, until the cam roller 141 engages another slot 444 whereupon the star-wheel will be rotated through another definite angle until the roller leaves the slot whereupon it is again locked as described, this intermittent motion being transmitted to shaft 50 by means of the bevel wheel 142 and pinion 143, and thence to the transfer chains 4, etc., as previously mentioned. It will be seen that the shaft 50 will only revolve after the shaft 24 has made a definite number of revolutions, at other times remaining stationary and the number of revolutions which will intervene between the movements of shaft 50 can be altered by replacing gear wheels 134 and 135 by others of different diameters.

Figure 9:
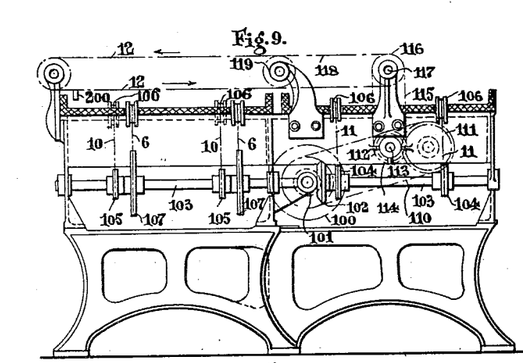
Figs. 9, 10 and 11 are respectively a side elevation (partly in section on line 9—9 Fig. 10), plan view and end elevation of a double transfer mechanism for conveying the trays alternately to two different series of tapping tables disposed alongside one another as represented in Fig. 2.
Figure 10:
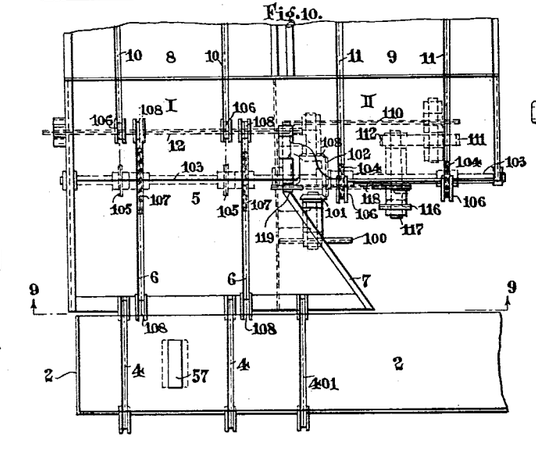
Figure 11:
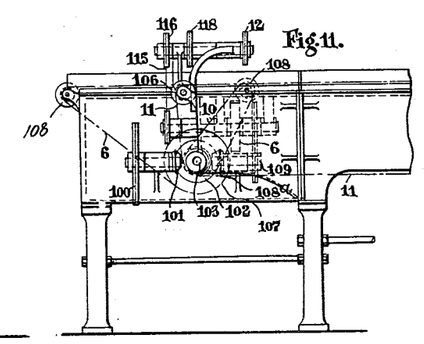

Referring to Figs. 9, 10 and 11, which show a double transfer device, the parts previously described are indicated by similar reference numerals and need not be further described but the particular feature of this device is the transfer chain 12 (see also Fig. 2) arranged over the intermediate table 5 and having a downwardly extending lug or abutment 200 to engage the edge of a tray at position I (Fig. 10) and carry same rapidly to position II, where it is engaged by the chains 11 of the second series of tapping tables 9. The chain 12 and the different transfer and conveyer chains concerned in this form of device may be driven by various means but those shown in the drawings include a chain wheel 100 continuously driven from the shaft 24 of the depositing machine and driving through bevel gears 101, 102, a shaft 103 carrying chain wheels 104 over which pass the conveyer chains 11 of the tables 9, and also other chain wheels 105 over which pass the conveyer chains 10 of the tables 8, these chains passing over suitable guide pulleys 106. The other transfer chains 6, 6, traversing the table 5 are also driven from shaft 103 at an increased speed relatively to that of the chains 10 and 11 by passing around chain wheels 107 on shaft 103 of larger diameter than the chain wheels 104 and 105. The said chains 6 are guided at the level of table 5 by means of pulleys 108. The bevel gear 102 before referred to, also meshes with another bevel gear 108ᵃ on shaft 109 from which is driven at twice the speed of the shaft 103 a chain 110 adapted to drive the half-time interrupted gears 111, 112, the latter being on a shaft 113 carrying a chain wheel 114 connected by chain 115 to chain wheel 116 on shaft 117 above the table, said latter shaft driving through chain 118 a shaft 119 from which the chain 12 is driven. Thus for every complete revolution of the chain wheel 100 the chain 12 is actuated during half of such revolution by gearing 111, 112 and parts described and remains at rest during the remainder of such revolution, whereby every other tray when at position I, Fig. 10, has its left hand end engaged by abutment 200 on the chain 12 and is carried by the latter to position II, Fig. 10, where it is engaged by the chains 11 and conveyed to the series of tables 9 where they are engaged by said chains 11.

Figure 12:
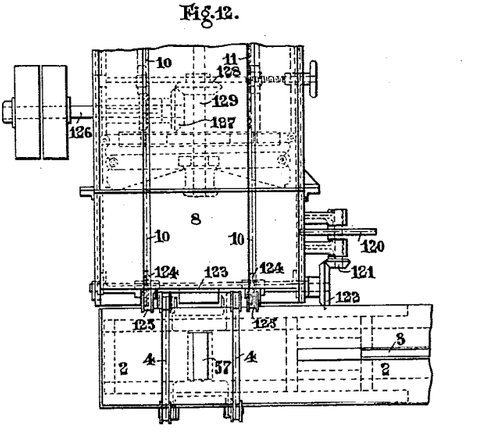
Fig. 12 is a plan view showing a portion of the filling table of the depositing machine and a portion of a single tapping table with the means for driving the conveyer chains of the tapping table and the means for actuating the tapping tables.

Fig. 12 shows means for driving the conveyer chains 10 of the tapping tables where a single series thereof is used, such means comprising a chain wheel 120 actuated in a similar manner to wheel 100 and driving through bevel gears 121, 122, a shaft 123 carrying chain wheels 124 about which said chains pass and are guided by pulleys 125. This figure also shows independently driven means for operating the tapping elements of the tables comprising the pulley shaft 126 driving through bevel gears 127, 128 a longitudinal shaft 129 on which the tapping cams are mounted in the known manner. The tapping mechanism may, however, also be driven from the same source as the depositing machine as shown in Fig. 2, where 130, 131 denote belts driving said tapping means and machine respectively and 132 bevel gearing driven by belt 130 and operating the tapping mechanism.

What I claim as my invention and desire to secure by Letters Patent of the United States is:—

1. In a machine of the character described the combination with a depositing machine including a feed hopper and a conveyer adapted to carry trays to receive deposits from said hopper, of a plurality of tapping tables disposed adjacent said conveyer and extending rectangularly thereto, and means including a conveyer operating at a greater rate of speed than the first mentioned conveyer for transferring the trays from said conveyer to one or other of said tapping tables alternately.

2. In a machine of the character described the combination with a depositing machine including a feed hopper, a feed table adjacent said hopper and a conveyer adapted to carry trays to receive deposits from said feed hopper, of mechanism for intermittently feeding said conveyer along said table, a tapping table disposed adjacent said feed table and extending rectangularly thereto, a conveyer traversing said tapping table, and means operating in conjunction with the conveyer feed mechanism for intermittently transferring said trays from the feed table in a rectangular direction to the tapping table conveyer, said means spacing the trays during their transfer from the feed table to the tapping table.

3. In a machine of the character described the combination with a depositing machine including a feed hopper, a feed table adjacent said hopper and a conveyer adapted to carry trays to receive deposits from said hopper, of mechanism adapted to intermittently feed said conveyer along said table, a shaft extending longitudinally of the table below the same, means whereby said shaft is rotated at intervals from the conveyer feed mechanism, transfer chains carried by and disposed transversely to the longitudinal shaft and means operated by the latter for imparting movement to said chains to discharge the trays from the feed table in a direction rectangular thereto.

4. In a machine of the character described the combination with a depositing machine including a feed hopper and a conveyer adapted to carry trays for receiving deposits from said hopper, of a plurality of tapping tables disposed side by side adjacent said conveyer and extending in a direction rectangular thereto, a table intermediate the conveyer and tapping tables, means for conveying the trays from the conveyer to the intermediate table, and means operating above the conveyer and tapping table and in timed relation with said conveyer for alternately transferring trays to the tapping table.

5. In a machine of the character described the combination with a depositing machine including a feed hopper, a feed table below said hopper, and a conveyer adapted to carry trays along said feed table to receive deposits from the hopper, of a plurality of tapping tables disposed side by side adjacent said feed table and extending in a direction rectangularly thereto, a table intermediate the feed table and tapping tables, chains adapted to convey the trays from the feed table to the intermediate table, other chains adapted to convey certain trays from the intermediate table to one of the tapping tables, a chain disposed above the latter adapted to convey other trays to a different tapping table, and means for actuating said chains from the depositing machine conveyer feed mechanism.

6. In a machine of the character described the combination with a depositing machine including a feed hopper, a feed table below said hopper and a conveyer adapted to carry trays to receive deposits from the hopper and convey same along said feed table, of a tapping table adjacent said feed table and disposed rectangularly thereto, transfer chains adapted to convey said trays from the feed table to the tapping table, said transfer chains traveling at a greater rate of speed than said conveyer whereby to space the trays, and means for driving said transfer chains at a higher speed than the depositing machine conveyer.

7. In a machine of the character described the combination with a depositing machine including a feed hopper, a feed table below same and an intermittently movable conveyer adapted to carry trays to receive deposits from said hopper and convey same along said feed table, of a plurality of tapping tables disposed side by side adjacent said feed table and extending in a direction rectangularly thereto, an intermediate table between the feed table and tapping tables, transfer chains adapted to convey the trays from the feed table to the intermediate table, means for intermittently driving said transfer chains at a higher speed than the depositing machine conveyer, other transfer chains adapted to convey certain trays from the intermediate table to one tapping table, means for intermittently driving said latter transfer chains at a higher speed than the first mentioned transfer chains, a chain disposed above the tables adapted to convey other trays to a different tapping table, and means for intermittently driving said last mentioned chain also at a higher speed than the transfer chains first mentioned.

8. In a machine of the character described the combination with a depositing machine including a feed hopper, a feed table below same and a conveyer adapted to carry trays to receive deposits from said hopper and convey said trays along said table, of mechanism for intermittently feeding said conveyer, chains carried by the feed table, means operating in conjunction with the conveyer feed mechanism for moving said chains to discharge the trays from said table in a direction transversely thereto, a roller carried by said feed table, and means for rotating said roller at a higher speed than that of the aforesaid conveyer, to impel the trays after leaving said conveyer to a proper position relatively to the chains.

9. In a machine of the character described, the combination with a depositing mechanism including a feed hopper, a table beneath said hopper, a conveyer traversing said table longitudinally, a plurality of conveyers traversing said table transversely and driven at a greater rate of speed than the first mentioned conveyer, a roller operating at a greater rate of speed than the last mentioned conveyers and disposed between the same, tapping tables disposed at right angles to the first mentioned table, and a transfer mechanism intermediate the first mentioned table and the tapping tables for supplying trays alternately to the tapping tables in spaced relation.

10. In a machine of the character described, the combination with a depositing mechanism including a feed hopper, a table beneath said hopper, a conveyer traversing said table longitudinally, means for periodically operating said conveyer, a plurality of conveyers traversing said table transversely and operating at a greater rate of speed and in timed relation with the first mentioned conveyer, tapping tables disposed at right angles to the first mentioned table, one of said tapping tables being in alinement with the transverse conveyer of said first mentioned table, a conveyer interposed between the first mentioned table and the tapping tables, a transfer mechanism operating above the tapping tables, and a conveying mechanism for delivering trays from the conveying mechanism and the tapping tables remote from the conveying mechanism.

In witness whereof I have signed this specification in the presence of two witnesses.

GEORGE SAMUEL BAKER.

Witnesses:
H. D. JAMESON,
C. P. LIDDON.

Copies of this patent may be obtained for five cents each, by addressing the "Commissioner of Patents, Washington, D. C."